(12) United States Patent
Wyss et al.

(10) Patent No.: US 11,659,089 B1
(45) Date of Patent: May 23, 2023

(54) SYSTEMS AND METHODS RELATING TO MANAGING CROSS-CHANNEL INTERACTIONS IN CONTACT CENTERS

(71) Applicant: GENESYS CLOUD SERVICES, INC., Daly City, CA (US)

(72) Inventors: Felix Immanuel Wyss, Indianapolis, IN (US); Robert Kassel, Daly City, CA (US)

(*) Notice: Subject to any disclaimer, the term of this patent is extended or adjusted under 35 U.S.C. 154(b) by 30 days.

(21) Appl. No.: 17/551,892

(22) Filed: Dec. 15, 2021

(51) Int. Cl.
*H04M 3/00* (2006.01)
*H04M 3/51* (2006.01)
*H04L 51/046* (2022.01)
*H04M 3/42* (2006.01)

(52) U.S. Cl.
CPC ........ *H04M 3/5191* (2013.01); *H04L 51/046* (2013.01); *H04M 3/42068* (2013.01); *H04M 3/5141* (2013.01)

(58) Field of Classification Search
CPC ........... H04M 3/5191; H04M 3/42068; H04M 3/5141; H04L 51/046
USPC ....... 379/265.01–265.14, 266.01–266.1, 309
See application file for complete search history.

(56) References Cited

U.S. PATENT DOCUMENTS

| | | | |
|---|---|---|---|
| 9,160,855 B2* | 10/2015 | Baranovsky | H04M 3/523 |
| 9,871,835 B2* | 1/2018 | O'Connor | H04L 67/02 |
| 2014/0164530 A1* | 6/2014 | Stoertenbecker | H04L 51/52 |
| | | | 709/206 |
| 2015/0195310 A1* | 7/2015 | Jaiswal | H04L 65/1083 |
| | | | 709/223 |
| 2016/0371703 A1* | 12/2016 | Monegan | H04L 67/148 |

* cited by examiner

*Primary Examiner* — William J Deane, Jr.

(57) ABSTRACT

A method facilitating a cross-channel interaction between a customer and a contact center. The method includes: receiving and conducting a first interaction with the customer; determining a first identifier related to the first interaction; storing, in a database, the first identifier and associating the first identifier with the first interaction; receiving a second interaction from the customer; determining a second identifier related to the second interaction; using the second identifier to check the database to determine if the second interaction is associated with the first interaction; determining, based on the check of the database, that the second interaction is contextually related with the first interaction; and modifying, in response to determining that the second interaction is contextually related to the first interaction, at least one way in which the second interaction is handled by the contact center.

23 Claims, 3 Drawing Sheets

SYSTEMS AND METHODS RELATING TO MANAGING CROSS-CHANNEL INTERACTIONS IN CONTACT CENTERS

BACKGROUND

The present invention generally relates to the field of customer relations management. More particularly, but not by way of limitation, the present invention relates to telecommunications systems in the field of customer relationship management, including delivering customer assistance via call or contact centers and internet-based service options.

BRIEF DESCRIPTION OF THE INVENTION

The present invention includes a computer-implemented method facilitating a cross-channel interaction between a customer and a contact center. The contact center may include a plurality of communication channels. The cross-channel interaction may include at least a first interaction between the customer and the contact center occurring via a first communication channel of the plurality of communication channels and a second interaction between the customer and the contact center occurring via a second communication channel of the plurality of communication channels. The method may include the steps of: receiving the first interaction and conducting the first interaction with the customer; determining a first identifier related to the first interaction; storing, in a database, the first identifier and associating the first identifier with the first interaction; receiving the second interaction from the customer; determining a second identifier related to the second interaction; using the second identifier to check the database to determine if the second interaction is associated with the first interaction; determining, based on the check of the database confirming an association between the second identifier and the first interaction, that the second interaction is contextually related with the first interaction; and modifying, in response to determining that the second interaction is contextually related to the first interaction, at least one way in which the second interaction is handled by the contact center.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
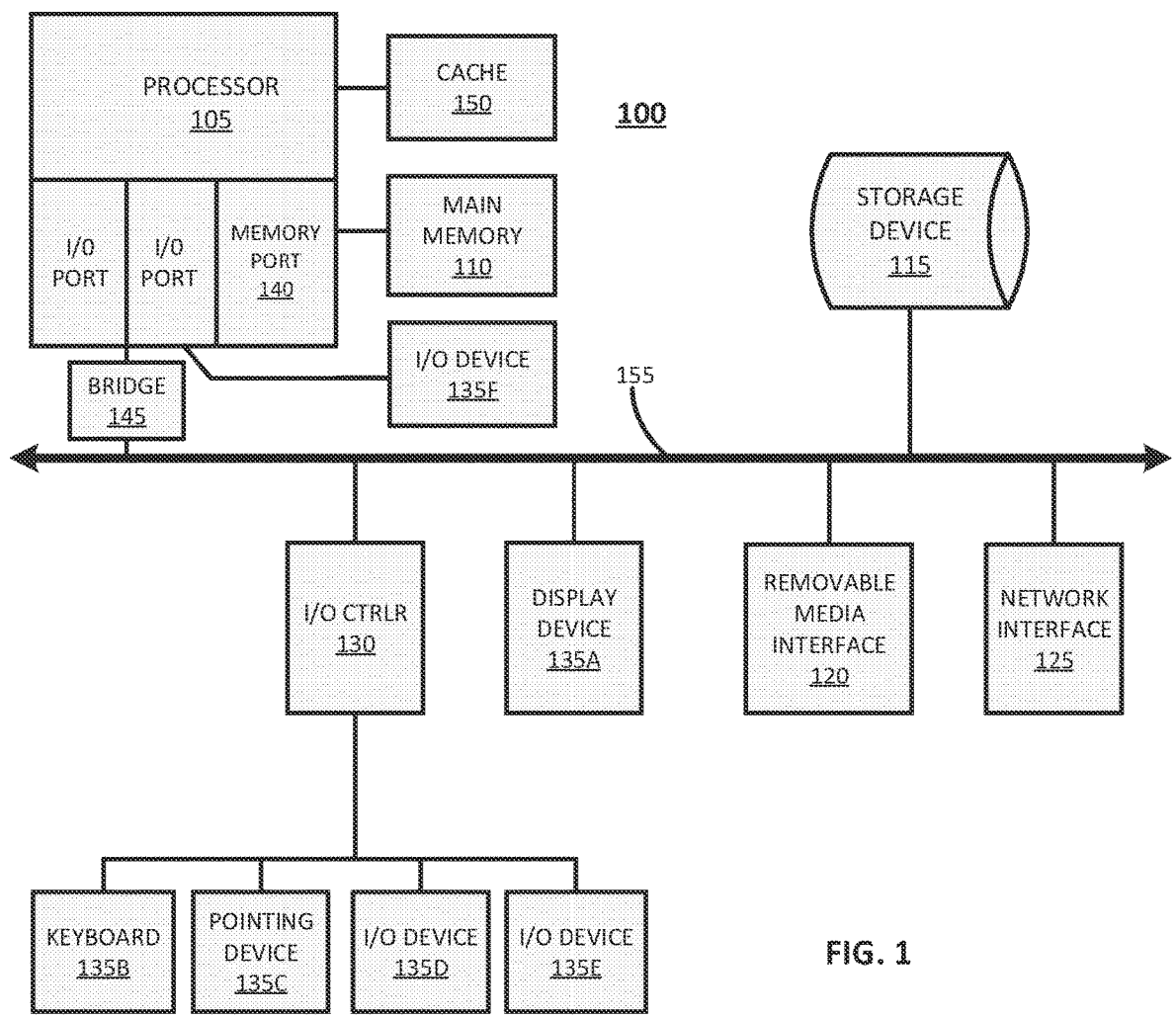
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the I/O devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network (PSTN), wireless carrier network, local area network (LAN), private wide area network (WAN), public WAN such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized. Other types of virtualization are also contemplated.

Contact Center

Figure 2:
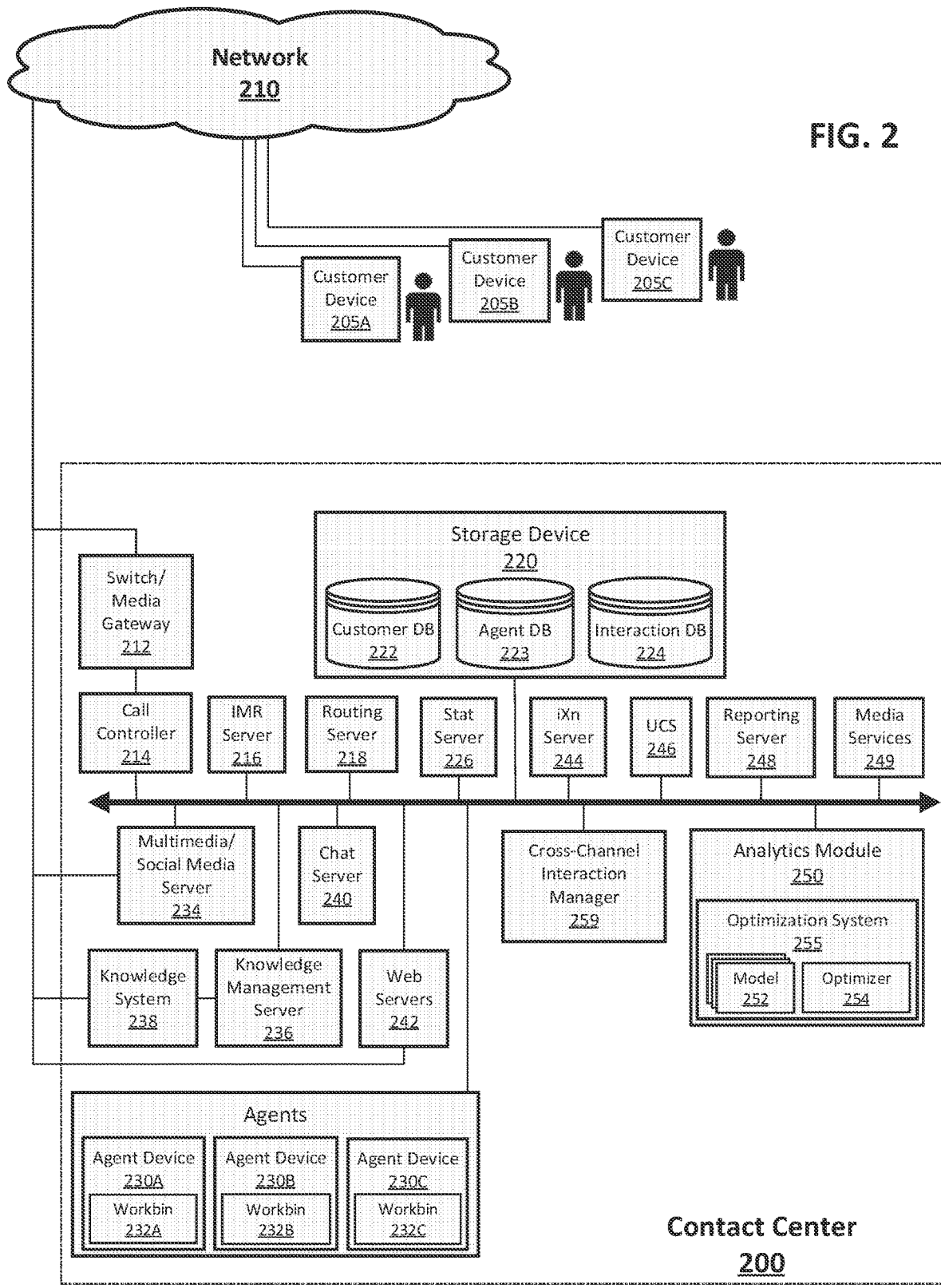
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs. Contact centers may include many different systems and modules—such as those shown in exemplary contact center system 200—in furtherance of this aim. The contact center system 200 may be used to engage and manage interactions in which automated processes (or bots) or human agents communicate with customers. As should be understood, the contact center system 200 may be an in-house facility to a business or enterprise for performing the functions of sales and customer service relative to its. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications or programs executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction server 244; universal contact server (or "UCS") 246; reporting server 248; media services server 249; an analytics module 250; and a cross-channel interaction manager module (or, simply, cross-channel interaction manager) 259. Any of the computer-implemented components, modules, or servers described in relation to FIG. 2 or in any of the following figures may be implemented via any type of computing devices, including the exemplary computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the cross-channel interaction manager 259, this component provides functionality related to preserving context in cross-channel interactions, which, as used herein, is defined as an interaction with the same customer that occurs across multiple communication channels. As discussed in more detail below, the cross-channel interaction manager 259 accomplishes this aim via orchestrating other components, servers, and modules of a contact center, such as those described above in relation to the example contact center system 200, so to provide the functionality described herein, as would be understood by one of ordinary skill in the art.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) which may be generated on the customer devices 205 and/or the agent devices 230.

Figure 3:
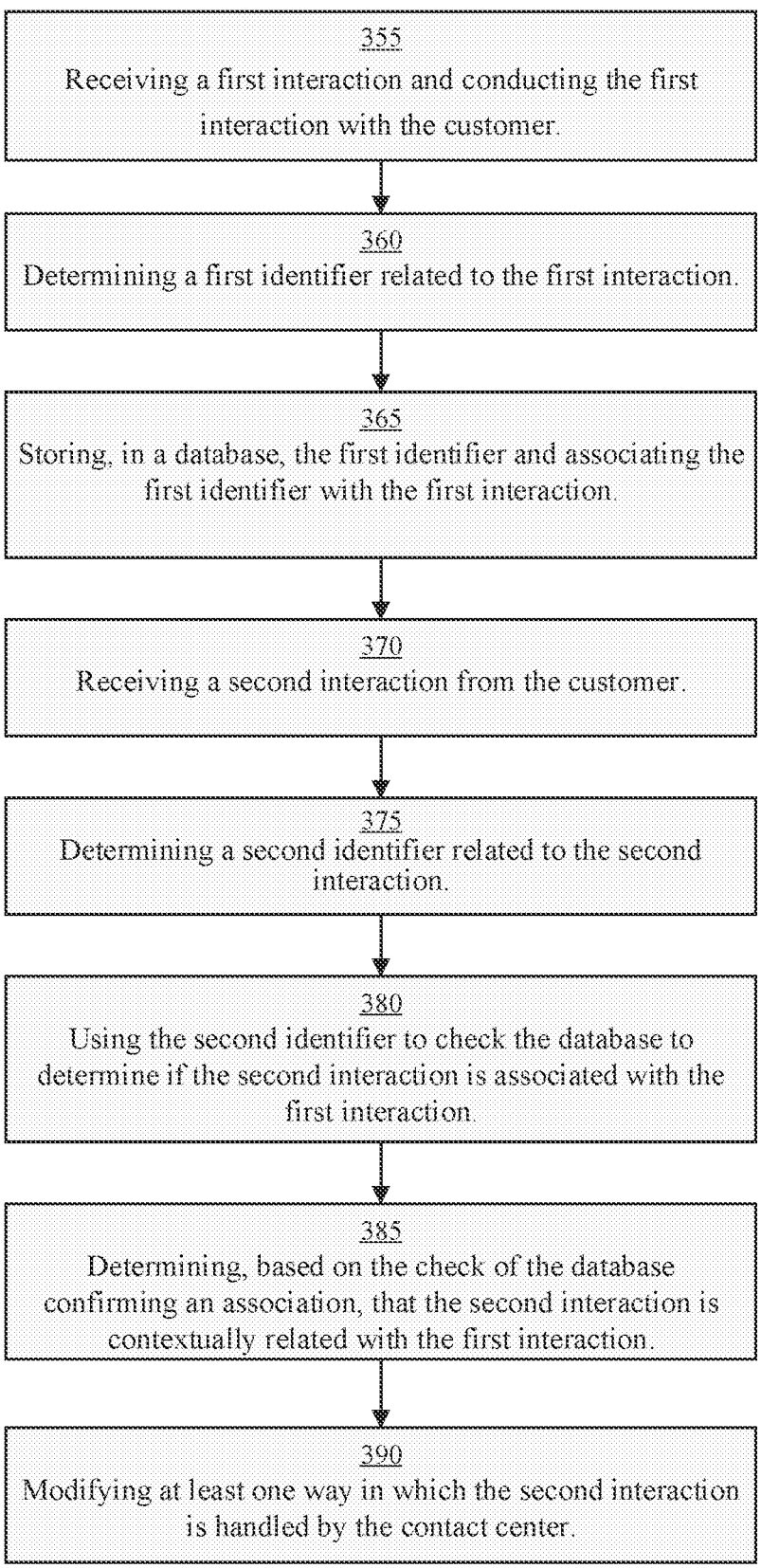
FIG. 3 is an automated process for managing cross-channel interactions in accordance with the present invention.

Turning now to FIG. 3, the functionality of the cross-channel interaction manager 259 will now be discussed in accordance with the present invention. Before proceeding with this, though, some background will first be provided as to how contact centers function while also highlighting some example operational shortcomings that the present invention is intended to address.

As will be appreciated, modern contact centers communicate or interact with customer over a variety of media or communication channels. These include, for example, voice (e.g., telephone calls or voice over IP or VoIP calls), video (e.g., video conferencing), text (e.g., emails and messaging or chat), screen sharing, co-browsing, etc. Within these available channels are those that are commonly referenced as "digital channels", which, in general, are those channels that are implemented via digital technologies. These channels, which may be described as supporting "digital interactions" with customers, include messaging or chat, email, social media, and others. Currently, messaging or chat is one of the most commonly used of the digital channels. Because of this, the several embodiments described below include chat in the example. It should be understood, however, that the functionality described may also apply to other types of digital channels.

Often contact center interactions begin as a digital interaction, for example, exchanging text in a chat session, and then, as the interactions progress, evolve into a voice interaction. This outcome happens for several reasons. For example, continued typing for customers can become tedious, particularly after several conversation turns. Additionally, the customer may begin a task, such as driving, that makes continued typing inappropriate. Further, as the interaction progresses, the questions from the customer may become more complicated and nuanced so that it would be more efficient for the agent and customer to converse. In such situations, the customer may desire a voice interaction so that they can speak directly with a contact center agent and complete their inquiry. The customer may initiate such an interaction over one of a voice channels, i.e., one of the channels that supports real-time voice communications. As an example, such a voice channel may be established as either a conventional telephone call or data network audio streaming (or simply, "audio streaming"). However, in today's contact center systems, the incoming voice interaction arriving via the voice channel is treated as a new interaction and not connected or associated with the chat interaction. Because of this, the context of the prior chat interaction is lost as well as the benefits that such context typically enable.

To address this situation, the present application proposes systems and methods for associating communications of a cross-channel interaction, which, for example, may include associating an incoming voice interaction with a previous or ongoing digital or chat interaction. In this way, context established within the digital interaction can be preserved across the two different communication channels and used to the benefit of the ongoing interaction with the customer. According to exemplary embodiments of the present disclosure, this functionality may be achieved in several different ways and examples of each are provided below. Initially, the following discussion will focus on the functionality by which communications over different channels are associated, i.e., determined as involving the same customer and/or involving same transaction or inquiry by that customer. After that, the discussion will turn to the functionality that occurs once this association is made. These aspects of the present invention address how the knowledge that the communications are from the same customer is put to use so to improve the way in which services can be delivered to them.

In accordance with the present invention, a first example of associating communications over different channels involves a customer initiating a digital interaction from a device through a web browser or user interface of an application—which, collectively, may be referred to as an "application user interface"—and then subsequently initiating a voice interaction via the same application user interface. More particularly, the digital interaction initiated by the customer is a chat interaction or, simply, a chat, by the application user interface. According to exemplary embodiments, the systems of the contact center, including the cross-channel interaction manager 259, analyzes data related to the chat session to determine characteristics related thereto. For example, the cross-channel interaction manager 259 may determine a source identifier that identifies the source of the chat. In this case, the source identifier is one that associates the chat as being sourced from the application user interface that the customer used to initiate and conduct the chat. As an example, the source identifier may include a unique identifier, such as a cookie, that is used in the communications between the browser or application user interface of the customer and the server of the contact center. The cross-channel interaction manager 259 then may record the source identifier in a database as being associated with the chat interaction.

At some point, either while the chat remains ongoing or at a time subsequent to when a final message in the chat is sent, the customer initiates another interaction with the contact center via another channel, which, in the example, is voice interaction via a voice channel. More particularly, the customer initiates the voice interaction using the application user interface. That is, the voice interaction is implemented via data network audio streaming using the same application user interface as the customer used to implement the chat. The systems and modules of the contact center, including the cross-channel interaction manager 259, analyzes information about the incoming voice interaction to determine characteristics related thereto. For example, the cross-channel interaction manager 259 may determine a source identifier that identifies a source of the voice interaction. Because the customer used the same application user interface to initiate both the chat and voice interactions, the source identifier for the voice interaction will be the same as the one determined for the chat interaction. The cross-channel interaction manager 259 may record the source identifier of the voice interaction in a database and/or perform a check to see if the source identifier identified for the voice interaction is associated with any ongoing or previous chat interactions. In other words, the cross-channel interaction manager 259 uses the source identifier of the voice interaction to check the database to determine if there is an associated digital interaction. When it is determined that the source identifier of the voice interaction is the same as the one for the chat interaction, the two interactions are then associated with each other (i.e., determined as being from the same customer and/or involving the same transaction or inquiry). Once the voice interaction is associated with a previous chat interaction, certain functionality will then be applied to the of the voice interaction, as will be discussed in more detail below.

In accordance with the present invention, a second example of associating communications over different channels involves a customer initiating a digital interaction, such as a chat, from a device that is already associated with a known telephone number. As will be appreciated, such an association may be based on prior transactions between the customer and contact center. The cross-channel interaction manager 259 may be configured to maintain records associating devices with known telephone numbers. To continue the example, the cross-channel interaction manager 259 may analyze data relating to the present chat to determine characteristics related thereto and, thereby, identify the device being used by the customer. This identity of the device may be accomplished via methods known in the art, such as by a unique source identifier, as discussed above or an IP address. Once the device is known, the cross-channel interaction manager 259 stores a record associating the present chat interaction with the device, which also associates the present chat interaction with the telephone number of the customer.

As before, at some point, the customer initiates a voice interaction via a voice channel. In this case, though, the voice interaction is initiated via the customer's phone. The phone number of the incoming call is determined and registered by the contact center. With the phone number, the cross-channel interaction manager 259 can then perform a check to see if there are any chats associated with a device associated with the phone number. In other words, the cross-channel interaction manager 259 uses the phone number to check the database to determine if there are any devices associated the phone number and, if so, whether any of those devices are associated with any ongoing or recent chat interactions. When these conditions are determined to be true, then the two interactions can then be associated with each other (i.e., determined as being from the same customer and/or involving the same transaction or inquiry). In this way, the incoming voice interaction from the customer's telephone number can be linked to the prior chat from the same customer. As stated, this association or linking of the two interactions will affect how the contact center handles the incoming voice interaction.

A third example involves a case similar to the one above, but the telephone number of the customer is not known by the contact center and, thus, not associated with the device initiating the digital or chat interaction. In this alternative, the customer is prompted to share their phone number through the digital channel. Once the phone number is shared, the present digital interaction is then associated with it. Then, as before, the cross-channel interaction manager 259 can associate the subsequent voice call from the telephone number with the customer's digital interaction.

A fourth example involves the customer identifying themselves through the digital channel, for example, by providing a customer ID number, that can then be used to link the customer to records that include a telephone number. The cross-channel interaction manager 259 can then associate the subsequent voice call from the telephone number with the customer and, by extension, the customer's digital interaction.

In a fifth example, the customer does not want to disclose their phone number. In this instance, the agent or automated process provides a unique interaction ID to the customer via the digital channel. The interaction ID is stored by the cross-channel interaction manager 259 and provides information identifying the ongoing digital interaction. When the customer places a voice call to the contact center, the customer is prompted or provided an option to provide the interaction ID. This can be done by either through an automated system or by sharing it with an agent. With the interaction ID, the link to the digital interaction is established, i.e., the telephone call is associated with the prior digital interaction.

In all of the cases, once a voice interaction is associated with a prior digital interaction, it is possible to then take certain actions that preserve and make use of the context that was established during the digital interaction. In accordance with exemplary embodiments, one action is to route the voice interaction to the same agent who handled the digital interaction. Alternatively, if that agent is not available to handle the voice interaction, the voice interaction may be routed to another agent with that agent being provided with a transcript of the digital interaction. Further, the transcript of the digital interaction may be used in selecting the other agent to which the voice interaction is routed. This may include analyzing the transcript of the digital interaction so to determine an intent of the customer, a subject matter of the interaction, as well as other criteria, such as importance or urgency or sensitivity. In this way, an agent may be selected in the routing process who has the appropriate knowledge, experience, and training to efficiently handle the voice interaction. As will be appreciated, this type of functionality may work with both automated bots and human agents.

In accordance with other embodiments, similar systems and methods may be used to associate a digital interaction with a prior voice interaction. According to another alternative embodiment, the present invention may be used to associate digital and voice interactions that are occurring concurrently and allow the interaction to be transacted over both channels concurrently. As will be appreciated, an advantage to this type of dual-channel concurrent functionality—i.e., allowing the interaction to be handled over both voice and digital channels at the same time—is that it addresses situations where a customer moves to an environment where voice communications would be difficult or inappropriate or where sensitive information needs to be communicated mid-conversation without the risk of it being overheard.

With specific reference now to FIG. 3, a method 350 is provided for facilitating a cross-channel interaction between a customer and a contact center. As described above, the contact center may include a plurality of communication channels, and as used herein, a cross-channel interaction is defined as including at least a first interaction between a customer and a contact center occurring via a first communication channel and a second interaction between the customer and the contact center occurring via a second communication channel.

At step 355, the method 350 includes the step of receiving the first interaction and conducting the first interaction with the customer. At step 360, the method 350 includes determining a first identifier related to the first interaction. At step 365, the method 350 includes storing, in a database, the first identifier and associating the first identifier with the first interaction. At step 370, the method 350 includes receiving the second interaction from the customer. At step 375, the method 350 includes determining a second identifier related to the second interaction. At step 380, the method 350 includes using the second identifier to check the database to determine if the second interaction is associated with the first interaction. At step 385, the method 350 includes determining, based on the check of the database confirming an association between the second identifier and the first interaction, that the second interaction is contextually related with the first interaction. And, at step 390, the method 350 includes modifying, in response to determining that the second interaction is contextually related to the first interaction, at least one way in which the second interaction is handled by the contact center. Several example embodiments will now be discussed.

According to a first exemplary embodiment, the first identifier and the second identifier each may be a source identifier. A source identifier is defined as a type of identifier that identifies a source application used by a customer to initiate an interaction. The first interaction may be a chat interaction, and the second interaction may be a voice interaction conducted via data network audio streaming. In such a case, for example, the chat interaction of the first interaction and the voice interaction of the second interaction may have been initiated by the customer via a common source application (i.e., the same source application), which may be configured to implement both chat interactions and voice interactions. For example, the common source application may be a web browser or an application user interface. The step of using the second identifier to check the database to determine if the second interaction is associated with the first interaction may include: checking the database to determine whether the second identifier matches any identifier stored therein related to previous interactions, and from this check, determining that the second identifier is a match to the first identifier stored in relation to first interaction; based on the determined match, determining that the first and the second interactions were both initiated from a common source application; and based on the determination that the first and the second interactions came from a common source application, determining that the second interaction is associated with the first interaction.

According to another exemplary embodiment, the method may further include the step of storing in the database a device identifier that identifies a user device known to be used by the customer and a phone number of a phone known to be used by the customer. The device identifier and the phone number may be stored in the database in association with each other. This step may be performed before the first interaction is initiated by the customer. As an example, this step may be performed as part of a previous transaction occurring between the customer and the contact center. In this example, the first interaction may be initiated by the customer using the user device. As such, the first identifier is determined to be the device identifier of the user device. The second interaction may be a phone call initiated by the customer using the phone. As such, the second identifier is determined to be the phone number of the phone. In this example, the step of using the second identifier to check the database to determine if the second interaction is associated with the first interaction may include: checking the database to determine whether the phone number determined as the second identifier is associated with any device identifiers and, in response to determining that the phone number is associated with a device identifier, retrieving a value for the device identifier; checking the database to determine whether any interaction stored therein is associated with an identifier matching the retrieved value of the device identifier; from this check, determining that the retrieved value of device identifier matches the first identifier stored in relation to first interaction; and upon determining that the retrieved value of device identifier matches the first identifier stored in relation to first interaction, determining that the second interaction is associated with the first interaction.

According to another exemplary embodiment, the step of determining the first identifier related to the first interaction may include: prompting the customer to provide a phone number for the phone that the customer uses; receiving from the customer the phone number; and determining that the received phone number is the first identifier. The second interaction may be initiated by the customer via a phone call initiated from the customer's phone, with the phone number being determined as the second identifier. In this example, the step of using the second identifier to check the database to determine if the second interaction is associated with the first interaction may include: checking the database to determine whether any interaction stored therein is associated with an identifier matching the phone number determined as the second identifier; from the check of the database, determining that the phone number determined as the second identifier matches the phone number determined as the first identifier; and based on the match, determining that the second interaction is associated with the first interaction.

According to another exemplary embodiment, the step of determining the first identifier related to the first interaction includes: providing to the customer an interaction ID during the first interaction, with that interaction ID becoming the first identifier. The step of determining the second identifier related to the second interaction includes: prompting the customer to provide the interaction ID during the second interaction; receiving from the customer the interaction ID; and determining that the received interaction ID is the second identifier. In this example, the step of using the second identifier to check the database to determine if the second interaction is associated with the first interaction may include: checking the database to determine whether any interaction stored therein is associated with the interaction ID determined as the second identifier; from the check of the database, determining that the interaction ID determined as the second identifier matches the interaction ID phone determined as the first identifier; and based on the match, determining that the second interaction is associated with the first interaction.

According to other exemplary embodiments, determining whether associated interactions are actually contextually related may be further conditioned on the extent of a measured time lag occurring between those interactions. The inclusion of this feature is based on the assumption that interactions by the same customer that occur close together in time are more likely contextually related, whereas if a long time passes between those interactions, the likelihood of those interactions being contextually related significantly decreases. As used herein, the term "contextually related" refers to whether the two interactions concern the same subject matter, such as both concerning the same customer query or transaction. In an example embodiment, the step of determining that the second interaction is contextually related with the first interaction is further based on: measuring a time lag occurring between when the second interaction is initiated by the customer and when the first interaction is terminated by the customer; and determining that the measured time lag is less than a maximum allowable time lag. As an example, the event of the first interaction from which the time lag may be measured includes a final message sent by the customer. In certain preferred embodiments, the maximum allowable time lag is set between 1 to 3 hours. In other embodiments, the maximum allowable time lag may be between 8 and 12 hours.

Once the two interactions are determined to be contextually related, the contact center may use this knowledge to modify ways in which the second interaction is handled. In according to certain embodiments, this may include the method also performing the step of saving text associated with the first interaction, where the saved text includes: text of communications sent by the customer to a first agent of the contact center during the first interaction; and text of communications sent by the first agent of the contact center to the customer during the first interaction. Then when the second interaction may be routed to a different agent, i.e., a second agent, of the contact center, a transcript of the saved text associated with the first interaction may be provided to the second agent so to assist the second agent in handling the second interaction. For example, the transcript may be provided to the second agent either before or while the second agent is handling the second interaction. As an additional step, an agent comment may be received from the first agent, where the agent comment is an observation made by the first agent about the first interaction that is not communicated to the customer. The agent comment, for example, may include some background information, an observation about the customer, and/or actions that might be taken to help solve the customer's problem. In such cases, the saved text associated with the first interaction may include the agent comment so that the agent comment is provided in the transcript to the second agent. In another example, the step of modifying the way the second interaction is handled by the contact center may include: analyzing the saved text to determine a query subject matter of the customer in the first interaction; and routing the second interaction to a second agent that is selectively chosen from a plurality of available agents by a predictive routing algorithm that prioritizes agents having a higher rating in at least one skill category deemed advantageous to handling an interaction having the query subject matter of the first interaction. Finally, the contact center may modify the way the second interaction is handled by making sure that the second interaction is routed to the same agent that handled the first interaction. That is, instead of treating the second interaction per a usual routing process by which any available agent may be selected, the knowledge that the second interaction is contextually related to the first interaction allows the contact center to advantageously route the second interaction to the same agent.

According to example embodiments, the step of determining the first identifier and second identifier may each include an automated process and be based on data exchanged during the first interaction and second interaction between the customer and the contact center. For example, the automated process may include a browser cookie, Internet Protocol (IP) address tracking, and other conventional methods.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof That which is claimed:

1. A computer-implemented method facilitating a cross-channel interaction between a customer and a contact center, wherein the contact center comprises a plurality of communication channels, and wherein the cross-channel interaction includes at least a first interaction between the customer and the contact center occurring via a first communication channel of the plurality of communication channels and a second interaction between the customer and the contact center occurring via a second communication channel of the plurality of communication channels, the method comprising the steps of:
   receiving and conducting the first interaction with the customer;
   determining a first identifier related to the first interaction;
   storing, in a database, the first identifier and associating the first identifier with the first interaction;
   receiving the second interaction from the customer;
   determining a second identifier related to the second interaction;
   using the second identifier to check the database to determine if the second interaction is associated with the first interaction;
   determining, in response to the check of the database confirming that an association exists between the second identifier and the first interaction, that the second interaction is contextually related with the first interaction; and
   modifying, in response to determining that the second interaction is contextually related to the first interaction, at least one way in which the second interaction is handled by the contact center.

2. The method of claim 1, wherein the first identifier and the second identifier each comprises a source identifier, wherein a source identifier is defined as a type of identifier that identifies a source application used by a customer to initiate an interaction.

3. The method of claim 2, wherein the first interaction comprises a chat interaction, and the second interaction comprises a voice interaction conducted via data network audio streaming; and
   wherein the chat interaction of the first interaction and the voice interaction of the second interaction are initiated by the customer via a common source application configured to implement both chat interactions and voice interactions.

4. The method of claim 3, wherein the common source application comprises one of a web browser and an application user interface.

5. The method of claim 3, wherein the step of using the second identifier to check the database to determine if the second interaction is associated with the first interaction comprises:
   checking the database to determine whether the second identifier matches any identifier stored therein related to previous interactions, and from this check, determining that the second identifier is a match to the first identifier stored in relation to first interaction;
   based on the determined match, determining that the first and the second interactions were both initiated from the common source application; and
   based on the determination that the first and the second interactions came from a common source application, determining that the second interaction is associated with the first interaction.

6. The method of claim 1, further comprising the steps of:
   storing in the database, before the first interaction is initiated by the customer, a device identifier that identifies a user device known to be used by the customer and a phone number of a phone known to be used by the customer, wherein the device identifier and the phone number are stored in the database in association with each other.

7. The method of claim 6, wherein the first interaction is initiated by the customer using the user device, and wherein the first identifier is determined to be the device identifier of the user device; and
   wherein the second interaction comprise a phone call initiated by the customer using the phone, and wherein the second identifier is determined to be the phone number of the phone.

8. The method of claim 7, wherein the step of using the second identifier to check the database to determine if the second interaction is associated with the first interaction comprises:
   checking the database to determine whether the phone number determined as the second identifier is associated with any device identifiers and, in response to determining that the phone number is associated with a device identifier, retrieving a value for the device identifier;
   checking the database to determine whether any interaction stored therein is associated with an identifier matching the retrieved value of the device identifier;
   from this check, determining that the retrieved value of device identifier matches the first identifier stored in relation to first interaction; and
   upon determining that the retrieved value of device identifier matches the first identifier stored in relation to first interaction, determining that the second interaction is associated with the first interaction.

9. The method of claim 1,
   wherein the step of determining the first identifier related to the first interaction comprises:
      prompting the customer to provide a phone number for a phone used by the customer;
      receiving from the customer the phone number; and
      determining that the received phone number is the first identifier;
   wherein the second interaction comprise a phone call initiated from the phone of the customer, wherein the phone number is determined to be second identifier;
   wherein the step of using the second identifier to check the database to determine if the second interaction is associated with the first interaction comprises:
      checking the database to determine whether any interaction stored therein is associated with an identifier matching the phone number determined as the second identifier;
      from the check of the database, determining that the phone number determined as the second identifier matches the phone number determined as the first identifier;

based on the match, determining that the second interaction is associated with the first interaction.

10. The method of claim 1,
wherein the step of determining the first identifier related to the first interaction comprises:
providing to the customer an interaction ID during the first interaction;
determining that the interaction ID is the first identifier;
wherein the step of determining the second identifier related to the second interaction comprises:
prompting the customer to provide the interaction ID during the second interaction;
receiving from the customer the interaction ID; and
determining that the received interaction ID is the second identifier;
wherein the step of using the second identifier to check the database to determine if the second interaction is associated with the first interaction comprises:
checking the database to determine whether any interaction stored therein is associated with the interaction ID determined as the second identifier;
from the check of the database, determining that the interaction ID determined as the second identifier matches the interaction ID phone determined as the first identifier;
based on the match, determining that the second interaction is associated with the first interaction.

11. The method of claim 1, wherein the step of determining that the second interaction is contextually related with the first interaction is further based on:
measuring a time lag occurring between when the second interaction is initiated by the customer and when the first interaction is terminated by the customer; and
determining that the measured time lag is less than a maximum allowable time lag.

12. The method of claim 1, further comprising the step of:
saving text associated with the first interaction, the saved text including:
text of communications sent by the customer to a first agent of the contact center during the first interaction; and
text of communications sent by the first agent of the contact center to the customer during the first interaction;
wherein the step of modifying the at least one way in which the second interaction is handled by the contact center comprises:
routing the second interaction to a second agent of the contact center; and
providing a transcript of the saved text associated with the first interaction to the second agent so to assist the second agent in handling the second interaction.

13. The method of claim 12, further comprising the step of:
receiving an agent comment from the first agent, the agent comment comprising an observation made by the first agent about the first interaction that is not communicated to the customer;
wherein the saved text associated with the first interaction includes the agent comment so that the agent comment is provided in the transcript to the second agent.

14. The method of claim 1, further comprising the step of:
saving text associated with the first interaction, the saved text including:
text of communications sent by the customer to a first agent of the contact center during the first interaction; and
text of communications sent by the first agent of the contact center to the customer during the first interaction;
wherein the step of modifying the at least one way in which the second interaction is handled by the contact center further comprises:
analyzing the saved text to determine a query subject matter of the customer in the first interaction; and
routing the second interaction to a second agent that is selectively chosen from a plurality of available agents by a predictive routing algorithm that prioritizes agents having a higher rating in at least one skill category deemed advantageous to handling an interaction having the query subject matter of the first interaction.

15. The method of claim 1, wherein the step of modifying the at least one way in which the second interaction is handled by the contact center further comprises:
routing the second interaction to the same agent that handled the first interaction.

16. The method of claim 1, wherein the step of determining the first identifier and second identifier comprises an automated process based on data exchanged during the first interaction and second interaction between the customer and the contact center; and
wherein the automated process includes at least one of a browser cookie and Internet Protocol (IP) address tracking.

17. A system facilitating a cross-channel interaction between a customer and a contact center, wherein the contact center comprises a plurality of communication channels, and wherein the cross-channel interaction includes at least a first interaction between the customer and the contact center occurring via a first communication channel of the plurality of communication channels and a second interaction between the customer and the contact center occurring via a second communication channel of the plurality of communication channels, the system comprising:
a processor; and
a memory, wherein the memory stores instructions that, when executed by the processor, cause the processor to perform the steps of:
receiving and conducting the first interaction with the customer;
determining a first identifier related to the first interaction;
storing, in a database, the first identifier and associating the first identifier with the first interaction;
receiving the second interaction from the customer;
determining a second identifier related to the second interaction;
using the second identifier to check the database to determine if the second interaction is associated with the first interaction;
determining, in response to the check of the database confirming that an association exists between the second identifier and the first interaction, that the second interaction is contextually related with the first interaction; and
modifying, in response to determining that the second interaction is contextually related to the first interaction, at least one way in which the second interaction is handled by the contact center.

18. The system according to claim 17, wherein the first interaction is initiated by the customer using the user device such that the first identifier is determined to be the device identifier of the user device, and the second interaction comprise a phone call initiated by the customer using the phone such that the second identifier is determined to be the phone number of the phone; and wherein the step of using the second identifier to check the database to determine if the second interaction is associated with the first interaction comprises:

checking the database to determine whether the phone number determined as the second identifier is associated with any device identifiers and, in response to determining that the phone number is associated with a device identifier, retrieving a value for the device identifier;

checking the database to determine whether any interaction stored therein is associated with an identifier matching the retrieved value of the device identifier;

from this check, determining that the retrieved value of device identifier matches the first identifier stored in relation to first interaction; and upon determining that the retrieved value of device identifier matches the first identifier stored in relation to first interaction, determining that the second interaction is associated with the first interaction.

19. The system according to claim 17, wherein the step of determining that the second interaction is contextually related with the first interaction is further based on:

measuring a time lag occurring between when the second interaction is initiated by the customer and when the first interaction is terminated by the customer; and determining that the measured time lag is less than a maximum allowable time lag.

20. The system of claim 19, wherein the memory stores further instructions that, when executed by the processor, cause the processor to perform the step of:

saving text associated with the first interaction, the saved text including:

text of communications sent by the customer to a first agent of the contact center during the first interaction; and text of communications sent by the first agent of the contact center to the customer during the first interaction;

wherein the step of modifying the at least one way in which the second interaction is handled by the contact center comprises:

routing the second interaction to a second agent of the contact center; and providing a transcript of the saved text associated with the first interaction to the second agent so to assist the second agent in handling the second interaction.

21. The system of claim 20, wherein the memory stores further instructions that, when executed by the processor, cause the processor to perform the step of:

receiving an agent comment from the first agent, the agent comment comprising an observation made by the first agent about the first interaction that is not communicated to the customer;

wherein the saved text associated with the first interaction includes the agent comment so that the agent comment is provided in the transcript to the second agent.

22. The system of claim 19, wherein the memory stores further instructions that, when executed by the processor, cause the processor to perform the step of:

saving text associated with the first interaction, the saved text including:

text of communications sent by the customer to a first agent of the contact center during the first interaction; and text of communications sent by the first agent of the contact center to the customer during the first interaction;

wherein the step of modifying the at least one way in which the second interaction is handled by the contact center further comprises:

analyzing the saved text to determine a query subject matter of the customer in the first interaction; and routing the second interaction to a second agent that is selectively chosen from a plurality of available agents by a predictive routing algorithm that prioritizes agents having a higher rating in at least one skill category deemed advantageous to handling an interaction having the query subject matter of the first interaction.

23. The system of claim 19, wherein the step of modifying the at least one way in which the second interaction is handled by the contact center further comprises:

routing the second interaction to the same agent that handled the first interaction.

\* \* \* \* \*